United States Patent [19]

Franza

[11] Patent Number: 6,035,187

[45] Date of Patent: Mar. 7, 2000

[54] APPARATUS AND METHOD FOR IMPROVED EMERGENCY CALL BOX

[75] Inventor: Thomas Alfred Franza, Mission Viejo, Calif.

[73] Assignee: Comarco Wireless Technologies, Inc., Irvine, Calif.

[21] Appl. No.: 08/743,952

[22] Filed: Oct. 30, 1996

[51] Int. Cl.[7] .............................. H04Q 7/20; H04M 11/04
[52] U.S. Cl. ........................... 455/404; 455/564; 379/45; 379/51
[58] Field of Search .................................. 455/404, 564; 379/45, 49, 51, 216, 355

[56] References Cited

U.S. PATENT DOCUMENTS

| 4,176,254 | 11/1979 | Tuttle et al. | 379/45 |
| 4,720,849 | 1/1988 | Tayama | 379/355 |
| 5,016,269 | 5/1991 | Rogers | 455/404 |

*Primary Examiner*—Andrew M. Dolinar
*Attorney, Agent, or Firm*—Pillsbury Madison & Sutro LLP

[57] ABSTRACT

A preferred embodiment of the present invention provides an emergency call box that has a cellular transceiver, a controller for controlling the cellular transceiver, and a memory for storing preprogrammed telephone numbers. Additionally, a display and push button selection switches are provided to allow bidirectional communication between the controller and a call box user. The controller presents the user with preprogrammed questions through the display, determines which one of the preprogrammed telephone numbers should be called based on the response received through the selection switches, and places a call to the determined telephone number using the cellular transceiver. In one embodiment, the controller determines whether there is an emergency or non-emergency situation based on the user's response, calls one of the preprogrammed telephone numbers if there is an emergency situation, and calls another of the preprogrammed telephone numbers if there is a non-emergency situation. In this way, the emergency call box can screen non-emergency calls and automatically route such calls to a location other than an emergency dispatch center. This removes the non-emergency calls from the call traffic received at the emergency dispatch center so that the emergency dispatch operator need only respond to true emergency situations.

16 Claims, 5 Drawing Sheets

Message 001

FIG.5E

Message 005

FIG.5B

Message 002

FIG.5F

Message 006

FIG.5C

Message 003

FIG.5G

Message 007

FIG.5D

Message 004

FIG.5H

Message 008

FIG.5I

Message 009

APPARATUS AND METHOD FOR IMPROVED EMERGENCY CALL BOX

FIELD OF THE INVENTION

The present invention relates to emergency telephone equipment, and more specifically to fixed location emergency telephone call boxes that enable communication with a central dispatch center.

BACKGROUND OF THE INVENTION

Examples of conventional emergency call boxes are disclosed in U.S. Pat. Nos. 5,377,256 and Re. 34,496. The disclosed call boxes include a cellular transceiver for bidirectional radiotelephonic communication of voice and data signals, and a controller for controlling the entire operation of the call box. The cellular transceiver and controller are contained within a rugged, tamper-resistant housing that is mounted on a roadside standard. The housing includes a door that opens to allow access to a standard telephone handset. The call box also includes various sensors that monitor the status of the call box to detect any abnormal conditions (for example, vandalism or door left open). Typically, the call box is powered by a battery whose charge is maintained by a solar panel mounted near the top of the standard.

When roadside assistance is required, a user opens the call box door and lifts the handset. This action causes a conventional handset hook switch to be activated to power up the call box. In response to a transition to an off hook switch condition, the microcontroller causes the cellular transceiver to dial a preprogrammed number for a central dispatch (or communication) center. Typically, the preprogrammed number is that of a highway patrol emergency dispatch center. Once the call is connected, an operator at the emergency dispatch center can communicate orally with the user and transmit and receive data, usually in the form of DTMF signals, to and from the call box. In this manner, the operator can control the operation of the call box and can request information from the call box such as the call box's identification number to provide the location of the user for dispatching roadside service.

Conventional call boxes can also initiate status calls to the emergency dispatch center or another preprogrammed number. For example, U.S. Pat. No. 5,016,269 discloses a call box whose controller places a daily report call to a central maintenance station (using a preprogrammed phone number) to report its present status and various statistics relating to its use. Additionally, the call box initiates an alarm call to the maintenance station or another preprogrammed number whenever certain status sensors detect an abnormal condition. Such conventional call boxes can also be remotely programmed from the central maintenance station. First, maintenance station personnel enter information that is to be used in programming a specific call box (or call boxes) in the maintenance station computer. Then, for example, when that call box places its next report call to the maintenance station, the maintenance station computer will program the call box with the new information. In this manner, call box parameters such as the emergency dispatch center telephone number and the time between report calls can be changed from the central maintenance station without the need to visit physically each of the roadside call boxes, which are dispersed over a wide geographic area.

While in such conventional call boxes, the preprogrammed number for the emergency dispatch center can be remotely changed, there exists a drawback in that all user-initiated calls are placed to the same preprogrammed phone number (i.e., the emergency dispatch center). However, many call box users that require assistance are not involved in true emergency situations. For example, a driver may use the call box to request assistance with a vehicle that is disabled on the roadside due to a lack of fuel or a flat tire. With a conventional call box, such non-emergency calls are included in the call traffic to the emergency dispatch center. Thus, the emergency dispatch operator must either handle non-emergency calls or determine that the call is not an emergency and transfer it to another number. This lessens the availability of the emergency operator to respond quickly to the true emergency situations.

Additionally, call box users who do not speak English cause a problem. The operator receiving the call must determine the language spoken by the user and route the call to an operator who speaks that language. This lessens the ability of the operator to respond quickly in an emergency situation. It may also be difficult for the user to determine the language being spoken by the user. Consequently, a call may have to be routed through several operators before an operator who can communicate with the user can be identified. This also results in the loss of valuable time. Furthermore, in conventional call boxes, the user and the operator can only communicate with one another using voice communication. Thus, a user who is deaf, hearing-impaired, or speech impaired may not be able to communicate the situation and the type of assistance required to the emergency operator. The difficulties experienced by a hearing-impaired user can also be aggravated by the fact that many emergency call boxes are located in extremely noisy roadside environments.

SUMMARY OF THE INVENTION

In view of these drawbacks, it is an object of preferred embodiments of the present invention to provide an emergency call box that is capable of screening non-emergency calls. Non-emergency calls are automatically identified and routed by the call box to a location other than the emergency dispatch center. Thus, the non-emergency calls are removed from the call traffic received at the emergency dispatch center, and the emergency dispatch operator need only respond to true emergency situations.

It is another object of the present invention to provide an emergency call box that can determine the language spoken by a user. Once the desired language is determined, the call box can pass that information with the call so that either: a device at the receiving station can automatically route the call to an operator who speaks the language, or the person receiving the call can route the call to an operator who speaks that language. Alternatively, the information could be used by the call box to determine the proper telephone number to call. In this way, the call box can automatically route calls to an operator who speaks the same language as the user.

Yet another object of the present invention is to provide an emergency call box that can be effectively used by a person who is deaf, hearing-impaired, or speech-impaired. By providing a display and a keyboard, such a person can bidirectionally communicate with an operator without the need for voice communication. It is another object of the present invention to provide an emergency call box that can determine if a user is speech or hearing-impaired. This allows calls by such persons to be automatically routed to the proper operator or a separate dispatch center.

According to one embodiment of the present invention, an emergency call box is provided that includes a radio transceiver, a controller programmatically controlling the transceiver, and a memory storing preprogrammed telephone numbers. Additionally, a communication means is provided to allow bidirectional communication between the controller and a call box user. The controller presents the user with preprogrammed questions through the communication means, determines which one of the preprogrammed telephone numbers to call based on the user's response, and places a call to the determined telephone number using the transceiver.

According to another embodiment of the present invention, an emergency call box is provided that includes a cellular transceiver, a controller for controlling the cellular transceiver, and a means for storing preprogrammed telephone numbers. Additionally, a dialogue means is provided to allow bidirectional communication between the controller and a call box user. The controller presents the user with preprogrammed questions through the dialogue means, determines whether there is an emergency or non-emergency situation based on the user's response, calls one of the preprogrammed telephone numbers if there is an emergency situation, and calls another of the preprogrammed telephone numbers if there is a non-emergency situation.

Yet another embodiment of the present invention provides a method of controlling an emergency call box. According to the method, a user is questioned and his responses are received. It is determined which one of a plurality of preprogrammed telephone numbers should be called based on the user's response, and a call is placed to the determined preprogrammed telephone number.

Other objects, features, and advantages of the present invention will become apparent from the following detailed description. It should be understood, however, that the detailed description and specific examples, while indicating preferred embodiments of the invention, are given by way of illustration only and various modifications may naturally be performed without deviating from the present invention.

DETAILED DESCRIPTION OF THE PREFERRED EMBODIMENTS

Preferred embodiments of the present invention will be described in detail hereinbelow with reference to the attached drawings.

Figure 1:
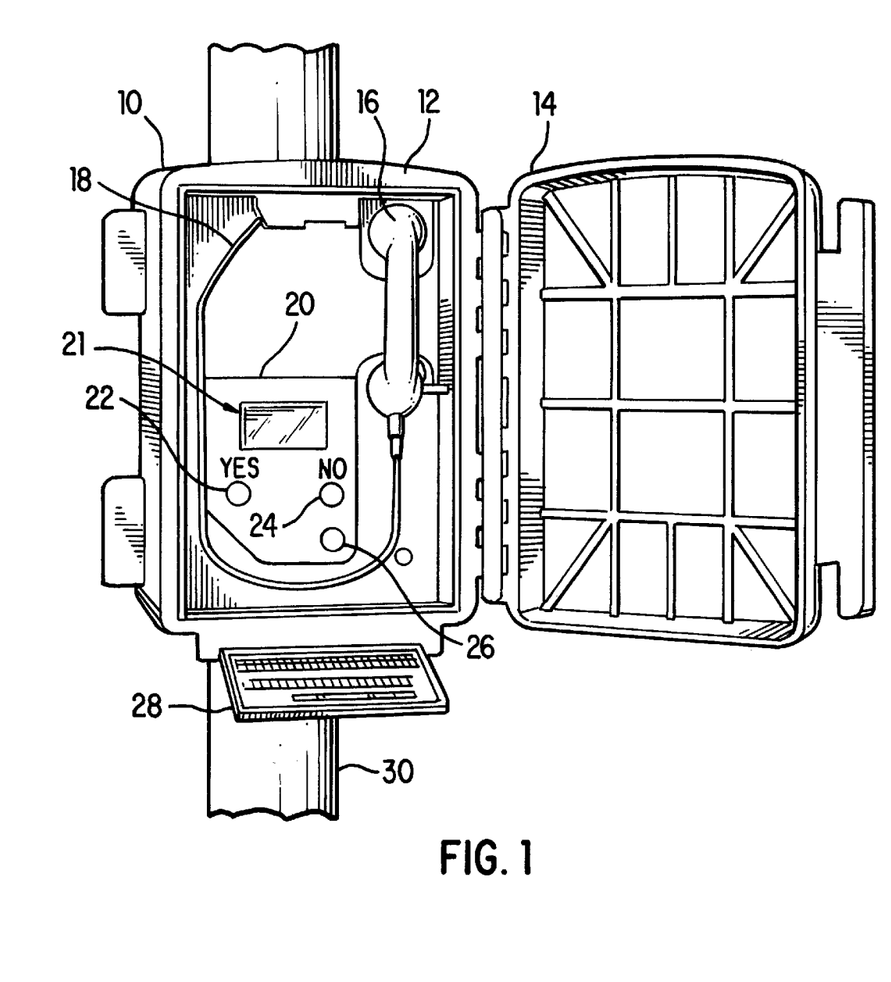
FIG. 1 is a perspective view of an emergency call box according to of a preferred embodiment of the present invention.

FIG. 1 shows a perspective view of a preferred embodiment of the emergency call box of present invention. The emergency call box 10 is formed by a rugged (e.g., cast aluminum) housing 12 that is attached to a road standard 30. The housing 12 includes a door 14 that opens to expose a phone and a user interface. Additionally, a sealed interior portion of the housing contains a cellular transceiver, control circuitry for the call box, and a power source (not shown). These interior components (except for the specific functionality provided by the present invention) are well known in the art and are described in detail in the above-mentioned patents so they will not be further described herein. Included in the housing are a standard telephone handset 16 attached to an armored cable 18, a dialogue display assembly 20, and a keypad assembly 28. The dialogue assembly includes a display 21 and push button selection switches 22, 24, and 26.

Figure 2:
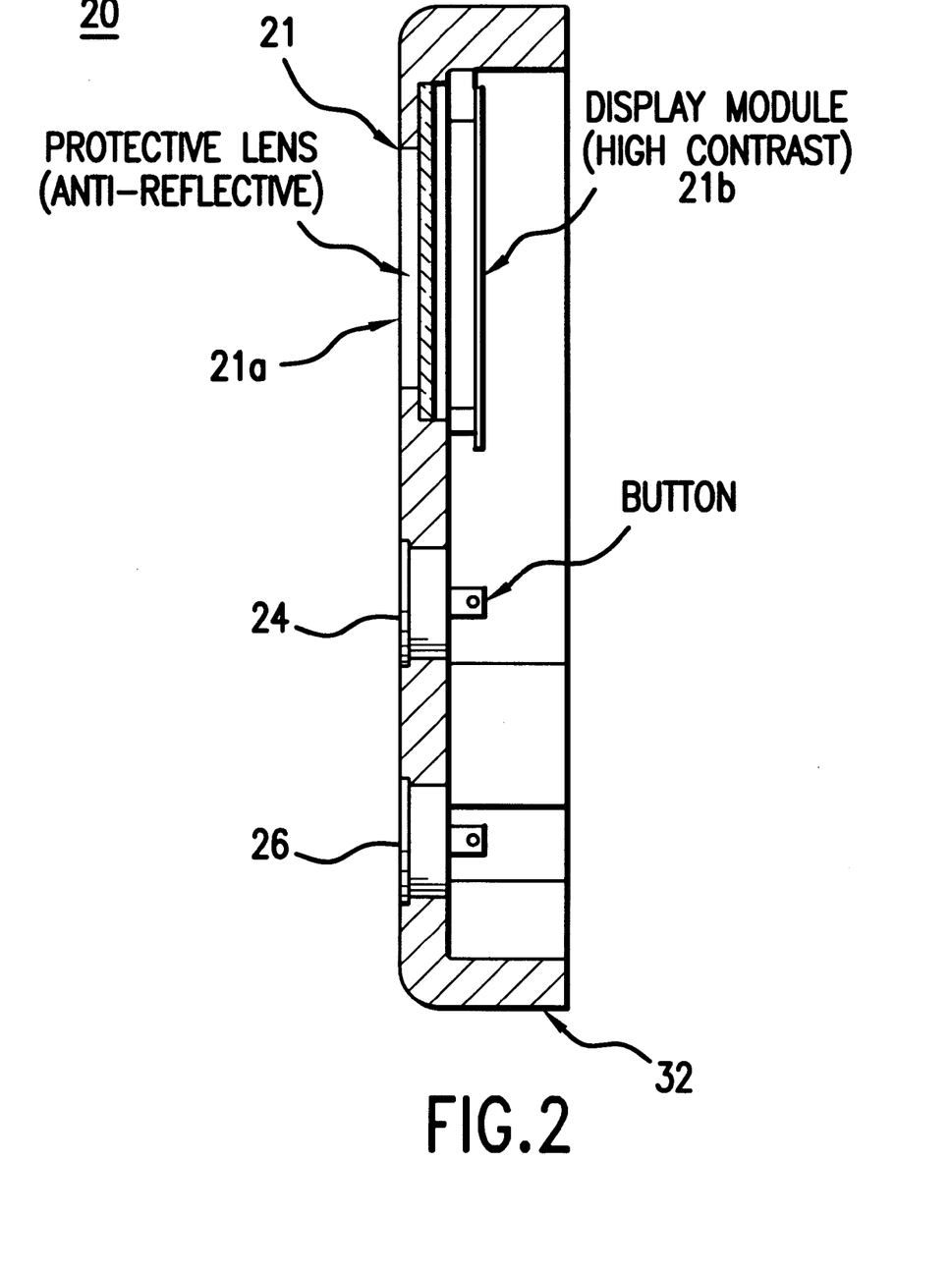
FIG. 2 is a sectional view of the dialogue assembly shown in FIG. 1.

FIG. 2 shows a sectional view of the dialogue assembly shown in FIG. 1. In preferred embodiments, the dialogue assembly 20 is designed to withstand both the elements and tampering. For example, in the embodiment shown in FIG. 2, the dialogue assembly is formed by a cast aluminum housing 32 containing an anti-reflective lens cover 21a, a high contrast display module 21b, and selection switches 24 and 26. The display module 21b is a full graphics display that allows for the creation of custom character sets through bit mapping of the active area pixel grid. This display flexibility makes it possible to change the size or typeface of the text through software modifications.

Further, the display 21 preferably has an extremely wide viewing angle (e.g., over 130°) from any orientation about the center. In one embodiment, the center of the display is located 47 inches above the ground to accommodate viewing by an individual in a wheelchair or a 70-inch tall individual in a standing position. The viewing angle is equally as wide from side to side about the center. The display 21 also features a high contrast ratio, giving it excellent readability in sunlight. The ergonomics of the display comply with guidelines defined in the "Human Engineering Guide to Equipment Design." Additionally, the selection switches 24 and 26 are hermetically sealed and have no moving parts. The switches employ internal strain-gage technology to extend their life beyond that of normal spring retracted push button switches using contacts. In a preferred embodiment, two switches are provided and labeled as "Yes" 22 and "No" 24 to allow the user to respond to questions presented on the display. A third switch labeled "Language Select" 26 is provided to allow the user to select the language of the display.

Likewise, in preferred embodiments, the keypad assembly is designed to be rugged in order to offer high reliability and protection. In one exemplary embodiment, the keypad assembly 28 (FIG. 1) consists of a cast aluminum housing containing a keypad plate, a polycarbonate membrane switch keypad, and a movement mechanism (not shown). The keypad plate is made of stainless steel that is passivated and then painted, and the movement mechanism includes a drive spring, an air damper, a door release mechanism, and nylon tracks. The keypad plate glides on the nylon tracks to provide smooth movement.

The keypad itself is a Lexan membrane with tactile feedback that utilizes membrane switch technology laminated between polycarbonate layers and hard coated to provide a hermetic seal impervious to harsh environments. The keypad's location is such that it can be used by an individual in a sitting position (e.g., in a wheelchair) or in a standing position. The membrane switch technology is designed to withstand a minimum of 100,000 cycles. In this embodiment, a user must pull the keypad assembly 28 out to a locking position when prompted by the display 21. On the other hand, the keypad assembly 28 will automatically retract when the housing door 14 is closed through the action of the drive spring damped by the use of an air pot. This mechanism provides a controlled velocity return of the keypad assembly to the stowed position.

Figure 3:
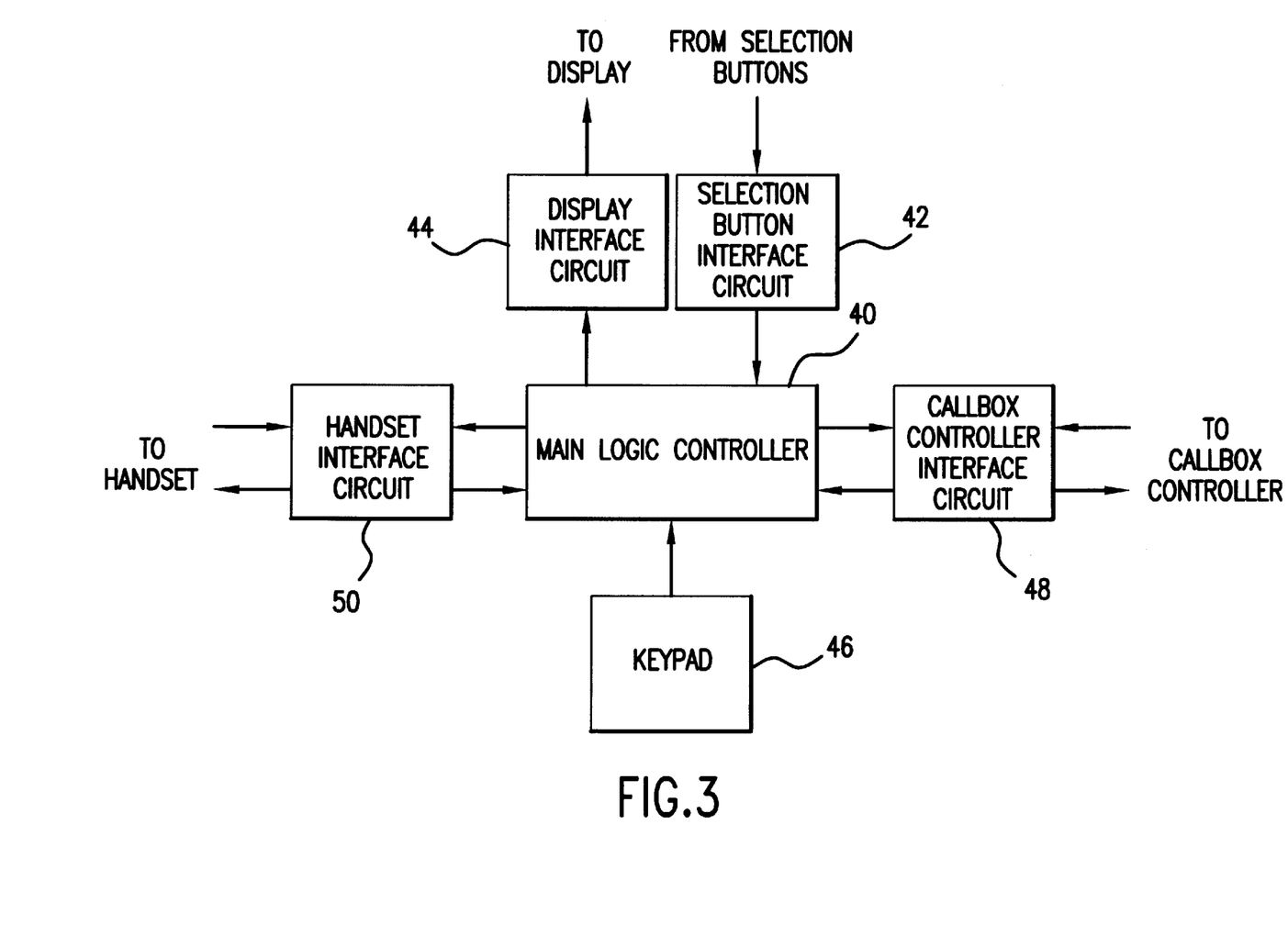
FIG. 3 is a block diagram of the dialogue and TDD control circuit interface of a preferred embodiment of the present invention.

FIG. 3 shows a block diagram of the dialogue and TDD control circuit interface of a preferred embodiment of the present invention. A main logic controller 40 is formed of a microcontroller-based logic circuit preferably having an external read-only memory. The controller 40 receives input from the selection switches through an interface circuit 42 and provides output to the display 21 through another interface circuit 44. Additional interface circuits 48 and 50 are provided for communicating with the call box controller and for transmitting and receiving audio signals to and from the handset. The main logic controller also receives input from the keypad 46.

The operation of the emergency call box according to a preferred embodiment of the present invention will now be explained with reference to FIGS. 4 through 5(i). In general, the call box of the present invention queries a user to determine which of a plurality of preprogrammed telephone numbers to call. In preferred embodiments, the emergency call box generates a series of preprogrammed yes/no questions that are designed to screen the emergency response calls (e.g., for a medical emergency) from the routine call traffic (e.g., for a flat tire). After determining the type of call, the emergency call box automatically routes the call to one of a set of preprogrammed numbers. The call box may also electronically tag the call (e.g., using call status registers) as an emergency or as a non-emergency call. The call box also notifies the user that the call is being placed and to where it is being placed.

Figure 4:
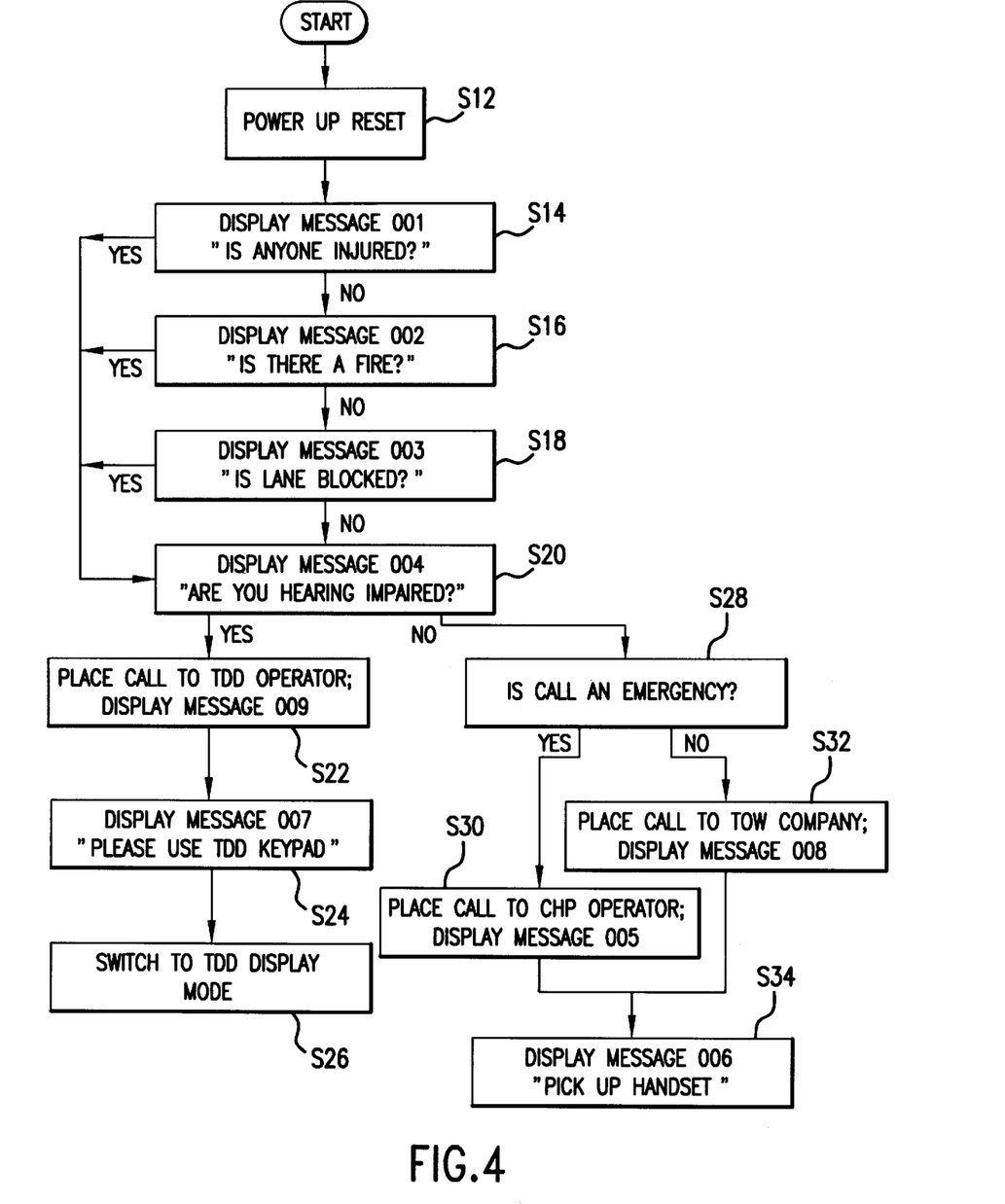
FIG. 4 is a flow chart of the process used in a preferred embodiment of the present invention to determine the telephone number to call.
Figure 5A:
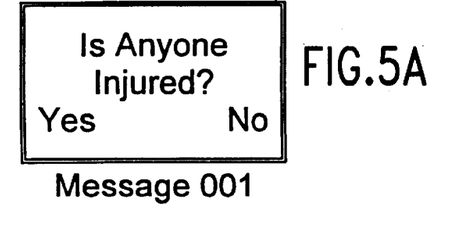
FIGS. 5(a) through 5(i) are examples of displays used in conjunction with the process shown in FIG. 4.
Figure 5B:
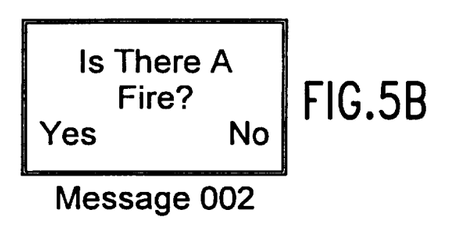
Figure 5C:
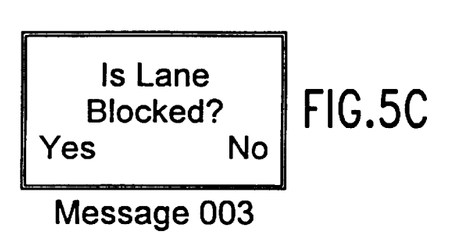
Figure 5D:
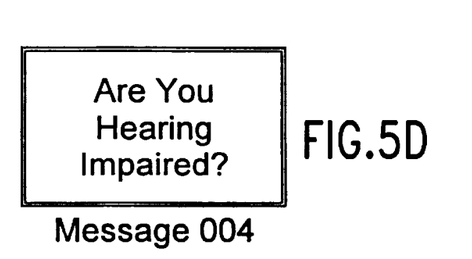
Figure 5E:
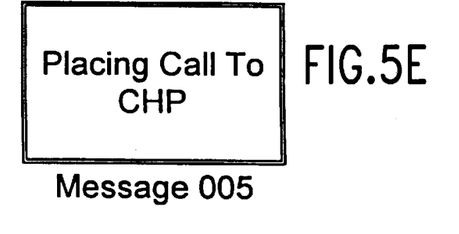
Figure 5F:
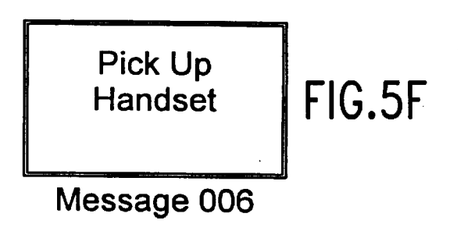
Figure 5G:
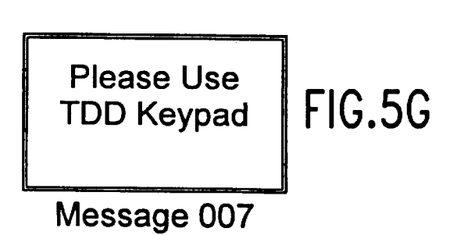
Figure 5H:
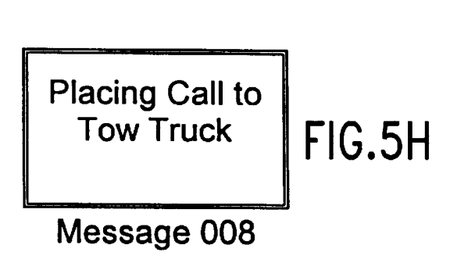
Figure 5I:
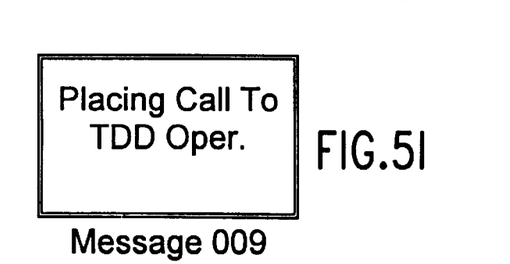

FIG. 4 shows in detail the process followed in one embodiment of the present invention. When the user opens the call box door, the display is immediately activated and a dialogue session begins after the reset step, step S12. The user is first prompted by a question asking if anyone is injured, step S14. To answer the question, the user pushes either the "YES" or "NO" switch (22 or 24, respectively) on the dialogue assembly 20. If the users response indicates that there has not been an injury, the call box next inquires if there is a fire, step S16. If the user again responds in the negative, the call box asks if a lane is blocked, step S18. If the user responds that a lane is not blocked, the call box proceeds to ask if the user is hearing impaired, step S20. On the other hand, if the response to any of the first three questions (i.e., steps S14, S16, and S18) is "yes," the call box tags the call as an emergency and proceeds directly to step S20.

If at step S20 the response indicates that the user is hearing impaired, the call box calls the telephone number for a TDD operator and so informs the user, step S22. The call box then instructs the user to use the keypad, step S24, and then switches to the TDD display mode, step S26. On the other hand, if the user is not hearing impaired, the call box checks to see if the call has been tagged as an emergency, step S28. If so, the call box places a call to an emergency operator and displays that information to the user, step S30. If not, the call box proceeds to call a non-emergency operator and so informs the user, step S32. Either way, the call box next instructs the user to pick up the handset so that normal voice communication can be established, step S34. Each call is electronically tagged using a call status register with the type of user and the type of emergency, if any. This information can be displayed on the operator's computer display as the call is received. In this way, the non-emergency calls can be automatically off loaded to other services while true emergency calls are quickly routed directly to the emergency response operator.

Additionally, in this embodiment of the present invention, the emergency call box has a language select switch located on the dialogue assembly. The user presses this language select switch 26 to cycle through the languages supported by the call box. Each time the language select switch is pushed, the display changes to show the current message in the next supported language. In this embodiment, the user can change the selected language anytime during the dialogue session but the selection is locked in when a call is placed. Besides making it easier for the user to answer the preprogrammed questions, the language select feature can also be used to route the call to an operator who speaks the user's language. For example, in one embodiment, the call box electronically tags the call with information regarding the selected language so that the person receiving the call can quickly route it to another operator, if necessary. In another embodiment, the information is used by the call box to determine which preprogrammed number to call. More specifically, the call box uses the language selected and the emergency tag to automatically route the call to an emergency or non-emergency operator who speaks the selected language.

FIG. 5 shows examples of display messages in English, but other languages such as Spanish, Chinese, and Korean may be displayed. The emergency call box can be programmed to display messages in almost any language and the number of languages supported is limited only by the available memory space. Typically, two of the most popular languages spoken in an area would be supported. For instance, in the Los Angeles area, emergency call boxes would support English and Spanish dialogue sessions. However, additional languages may be supported. For example, upon the opening of the call box door, greeting messages in various languages could be sequentially displayed, directing the user to press the language selection switch 26 to select the user's preferred language.

In preferred embodiments, the main logic controller 40 processes all of the dialogue session data, and decodes and generates the TDD mode signals (FIG. 3). The main logic controller sends the interrogatory messages as well as received (and decoded) TDD mode messages to the display through the interface circuit 44. The user responses (via the selection switches) are supplied to the controller 40 through another interface circuit 42. The main logic controller executes the calling and tagging procedures through the interface 48 with the call box controller. All of the display messages are stored in the controller's non-volatile read-only memory. Thus, changes to the preprogrammed questions or other messages can be accomplished by reprogramming the controller 40.

In the TDD mode (step S26 of FIG. 4), the main logic controller 40 operates such that the call box functions as a standard TTY terminal. The TTY standard is used to provide interactive communications for speech and hearing-impaired persons over the conventional switched telephone network. In TTY, data is transmitted using the standard Baudot code in which five equal-length bits represent one character with a start bit and a stop bit normally being added for a total of seven bits per character. The nominal transmission speed is 45 baud, and the tone frequency conventions are 1400 Hz for mark and 1800 Hz for space. In TDD mode, the main logic controller 40 generates and decodes the TTY audio signals, which are transmitted and is received through the handset terminals via the handset interface circuit 50. Decoded messages are sent to the display through the interface 44 and user input is received from the keypad 46. Thus, bidirectional communication between the user and the TDD operator is accomplished through the keypad and display.

All DTMF data signal generation and decoding is performed by the standard call box controller in this embodiment. The call box controller is programmed to recognize a standard set of DTWF data codes. (Alternatively, another data transmission protocol such as CDPD could be used in transmitting the data.) Additionally, a new data code is provided to allow the operator at the dispatch center to request the call status tag, which contains information such as emergency/non-emergency situation, voice/TDD call, and selected language. Further, the main logic controller 40 provides self-testing capabilities by monitoring the dialogue assembly and keypad for fault conditions and reporting the results to the call box controller. This function is integrated into the standard call box status/alarm system and is reported in the same manner as any other status or alarm condition.

As previously explained, preferred embodiments of the present invention provide an emergency call box that is capable of screening non-emergency calls. After non-emergency calls are identified, they are automatically routed to a location other than the emergency dispatch center. This removes the non-emergency calls from the call traffic received at the emergency dispatch center so that emergency dispatch operators need only respond to true emergency situations.

Other embodiments of the present invention provide an emergency call box that determines the language spoken by a user. That language is either passed on to the operator or used by the call box to determine which telephone number to call. This allows the user to quickly reach an operator who speaks the same language. Still further embodiments provide an emergency call box with a display and data input device for use by speech or hearing-impaired users. The call box identifies such users and routes their calls to a special operator or a separate dispatch center.

The embodiments of the present invention described above relate to an emergency call box having a certain type of display, keyboard, and selection switches. However, the call box could use virtually any type of display, alphanumeric input device, and selection device. Similarly, while the control logic for the new features is shown as a separate circuit connected to the call box's (main) controller, the logic and control for the additional features could be integrated into the call box controller. Also, the call status information can be stored in RAM (not shown) in the call box and transmitted over the air in response to an inquiry from a central controller, as detailed in U.S. Pat. No. 5,016,269 (columns 5–8), which is herein incorporated by reference. Additionally, the number of preprogrammed questions, the sequence of questions, and the exact questions asked are merely a matter of design choice. Depending on the desired information, the call box could easily be adapted by one skilled in the art to ask more (or less) questions or different questions. Similarly, instead of skipping preprogrammed questions when an emergency condition is identified, the call box could be easily adapted to ask all (or a subset of) the preprogrammed questions regardless of the user's response to the questions. In this way, more specific status information could be sent with each call through, for example, DTMF signaling, and further, the calls received at the dispatch center could be placed in a queue according to a priority scheme (e.g., a call indicating that there is a fire could be placed ahead of all calls indicating only that a lane is blocked).

Other design choices, such as the number and location of selection switches and displays could easily be adapted. Likewise, the method of asking the questions and taking responses could be altered. For example, the user could be asked the questions by a prerecorded voice and/or the user could respond by merely speaking (e.g., using the handset). The call box could discern the user's vocal response using automatic voice recognition technology. Thus, in some embodiments, the display and/or switches could be omitted. Furthermore, embodiments of the present invention may not include all of the features described above. For example, language selection or TDD mode capabilities may not be available in all embodiments.

In addition to transmitting telephone calls to different numbers, one could also have the system encode a priority for each message being transmitted to any telephone number and have the call placed to a central call processing computer such as an automatic call distributor or a computer aided dispatch terminal. For example, if all calls are being dispatched to the highway patrol emergency call center, irrespective of the type of call, it is important that certain types of calls such as medical emergency calls be processed and provided to operators first. To that end, in other embodiments, when the user responds to the query for the type of roadside assistance that is needed, the call is assigned with a priority. Those calls requiring medical assistance get the highest priority for example and those calls requiring a tow truck where the freeway is blocked get the lowest priority. The assigned priority, which may be a number zero through 3, for example for lowest to highest priority, may be encoded at the start of the call as a DTMF signal being transmitted by the phone to the answering computer. The answering computer will then route the calls to the next available operator based upon priority so that all medical emergencies are passed to operators first; only when there are no medical emergencies that are unanswered do the requests for a fire engine get passed to an operator; only when there are no medical emergencies and no fire emergencies unanswered will the requests for tow trucks be processed. Of course, those calls are processed so that calls regarding disabled vehicles that are blocking traffic are passed to an emergency operator before the calls for vehicles sitting on the shoulder.

While there has been illustrated and described what are presently considered to be the preferred embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the following claims.

What is claimed is:

1. An emergency call box for use by a user, said emergency call box comprising:

a radio transceiver;

a controller programmatically controlling the transceiver;

communication means for allowing bidirectional communication between the controller and the user; and memory storing either a plurality of preprogrammed telephone numbers or a plurality of priority codes, wherein the controller prompts the user with at least one preprogrammed message through the communication means, determines which one of the preprogrammed telephone numbers should be called or which one of the priority codes should be transmitted based on the response by the user, and places a call to the determined telephone number using the transceiver to either the selected one of the numbers or transmits the selected one of the codes.

2. The emergency call box as defined in claim 1, wherein the communication means includes a display for communicating messages to the user and an input means for receiving responses from the user.

3. The emergency call box as defined in claim 2, wherein the input means includes a plurality of push button selection switches.

4. The emergency call box as defined in claim 1,
wherein the controller determines whether there is an emergency or non-emergency situation based on the user's response to the preprogrammed message(s),
the controller calls one of the preprogrammed telephone numbers if it determines there is an emergency situation, and
the controller calls another of the preprogrammed telephone numbers if it determines there is a non-emergency situation.

5. The emergency call box as defined in claim 1, wherein the controller determines which language is spoken by the user through the communication means.

6. The emergency call box as defined in claim 1, further comprising a keypad connected to the controller, the controller receiving user input through the keypad and transmitting the received input as data using the transceiver.

7. The emergency call box as defined in claim 6,
wherein the controller determines if the user is hearing or speech-impaired using the communication means, and
the controller calls a specific one of the preprogrammed telephone numbers if the controller determines the user is hearing or speech-impaired or transmits a specific code if the caller is hearing impaired, and
the controller calls another of the preprogrammed telephone numbers or transmits a different code if the controller determines the user is not hearing or speech-impaired.

8. An emergency call box of the type that enables bidirectional radiotelephonic communication between a user and a remote location, said emergency call box comprising:
a display presenting information to the user;
push button selection switches receiving information from the user;
a controller providing output to the display and receiving input from the selection switches;
means for storing a plurality of preprogrammed telephone numbers, the preprogrammed telephone number corresponding to a plurality of remote locations; and
means for storing a plurality of preprogrammed questions,
wherein the controller presents the user with at least one of the preprogrammed questions through the display, receives the user's response through the selection switches, and determines which one of the preprogrammed telephone numbers to call based on the user's response.

9. The emergency call box as defined in claim 8,
wherein the controller determines whether there is an emergency or non-emergency situation based on the user's response,
the controller calls one of the preprogrammed telephone numbers if it determines there is an emergency situation, and
the controller calls another of the preprogrammed telephone numbers if it determines there is a non-emergency situation.

10. The emergency call box as defined in claim 8, wherein the controller determines which language is spoken by the user using the selection switches, and presents information on the display in the language spoken by the user.

11. The emergency call box as defined in claim 8, further comprising a keypad coupled to the controller, the controller receiving user input from the keypad and transmitting the received input as data.

12. The emergency call box as defined in claim 11,
wherein the controller determines if the user is hearing or speech-impaired through the display and selection switches, and
the controller calls one of the preprogrammed telephone numbers if it determines the user is hearing or speech-impaired, and
the controller calls another of the preprogrammed telephone numbers if it determines the user is not hearing or speech-impaired.

13. A method of controlling an emergency call box of the type that enables bidirectional radiotelephonic communication between a user and a remote location, said method comprising the steps of:
questioning a user;
receiving the user's response to the questioning;
determining which language is spoken by the user;
determining which one of a plurality of preprogrammed telephone numbers should be called based on the user's response determining which one of a plurality of preprogrammed codes should be transmitted based on the user's response; and
placing a call to the determined preprogrammed telephone number or transmitting the preprogrammed call.

14. A method of controlling an emergency call box of the type that enables bidirectional radiotelephonic communication between a user and a remote location, said method comprising the steps of:
questioning a user;
receiving the user's response to the questioning;
determining which one of a plurality of preprogrammed telephone numbers should be called based on the user's response or determining which one of a plurality of preprogrammed codes should be transmitted based on the user's response including:
determining if the user is hearing or speech-impaired based on the user's response to the questioning;
determining that one of the preprogrammed telephone numbers should be called if it is determined that the user is hearing or speech-impaired; and
determining that another of the preprogrammed telephone numbers should be called if it is determined that the user is not hearing or speech-impaired; and
placing a call to the determined preprogrammed telephone number transmitting the preprogrammed call.

15. A method of controlling an emergency call box of the type that enables bidirectional radiotelephonic communication between a user and a remote location, said method comprising the steps of:
questioning a user;
receiving the user's response to the questioning;
determining which one of a plurality of preprogrammed telephone numbers should be called based on the user's response or determining which one of a plurality of preprogrammed codes should be transmitted based on the user's response including:

determining whether there is an emergency or a non-emergency situation based on the user's response to the questioning;

determining if the user is hearing or speech-impaired based on the user's response to the questioning;

determining that a first of the preprogrammed telephone numbers, which corresponds to a non-voice communication operator, should be called if it is determined that the user is hearing or speech-impaired;

determining that a second of the preprogrammed telephone numbers, which corresponds to an emergency dispatch operator, should be called if it is determined that there is an emergency situation; and determining that a third of the preprogrammed telephone numbers, which corresponds to a non-emergency dispatch operator, should be called if it is determined that there is a non-emergency situation; and placing a call to the determined preprogrammed telephone number or transmitting the preprogrammed call.

16. An emergency call box for use by a user, said emergency call box comprising:

a radio transceiver;

communication means for allowing bidirectional communication between the call box and the user;

memory storing a plurality of preprogrammed telephone numbers or preprogrammed priority codes; and a controller controlling the call box according to a program, said program including the steps of:

questioning the user through the communication means to determine if there is an emergency situation involving at least one of an injured person, a fire, and a blocked lane;

questioning the user through the communication means to determine if the user is hearing or speech-impaired;

placing a call through the transceiver to a first preprogrammed telephone number or transmitting a first preprogrammed code, which corresponds to a TDD operator, and switching the communication means to a TDD mode, if the user's response indicates that the user is hearing or speech-impaired;

placing a call through the transceiver to either a second preprogrammed telephone number or with a second predetermined code, which corresponds to an emergency operator, if the user's response indicates that there is an emergency situation;

placing a call through the transceiver to a third preprogrammed telephone number, which corresponds to a non-emergency operator, if the user's response indicates that there is not an emergency situation or placing a call using the third code so that calls with the higher code are routed to the operator first; and informing the user of which type of call is being placed.

* * * * *